June 17, 1969  L. J. SIRI ET AL  3,451,026
REMOTE INDICATING THERMOMETER CIRCUIT CONTROL DEVICE
Filed July 3, 1967  Sheet 1 of 2

INVENTORS
PHILIP W. EMBURY Jr
LOUIS J. SIRI
BY
Stephen J. Rudy
ATTORNEY

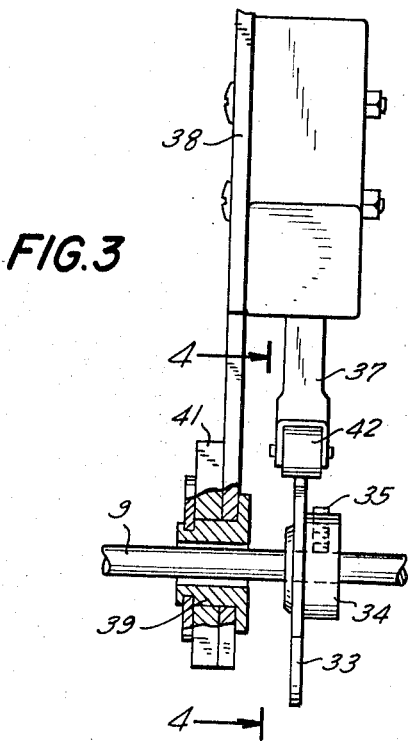
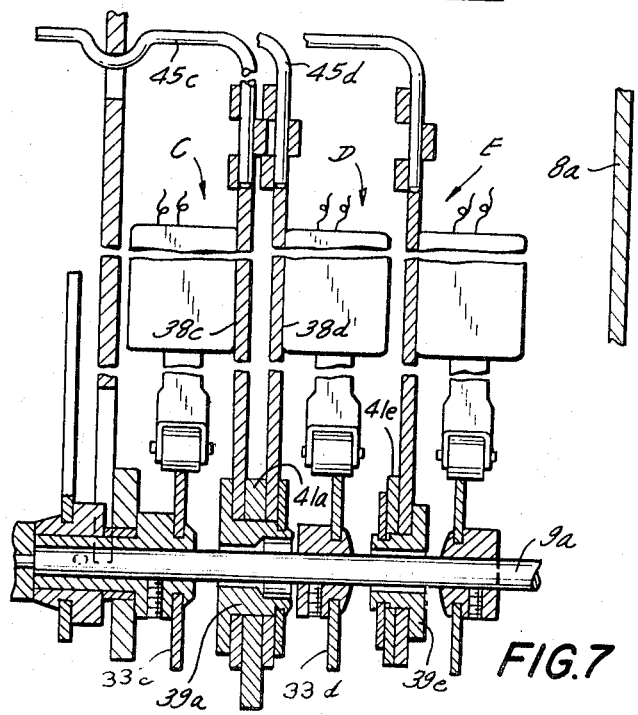
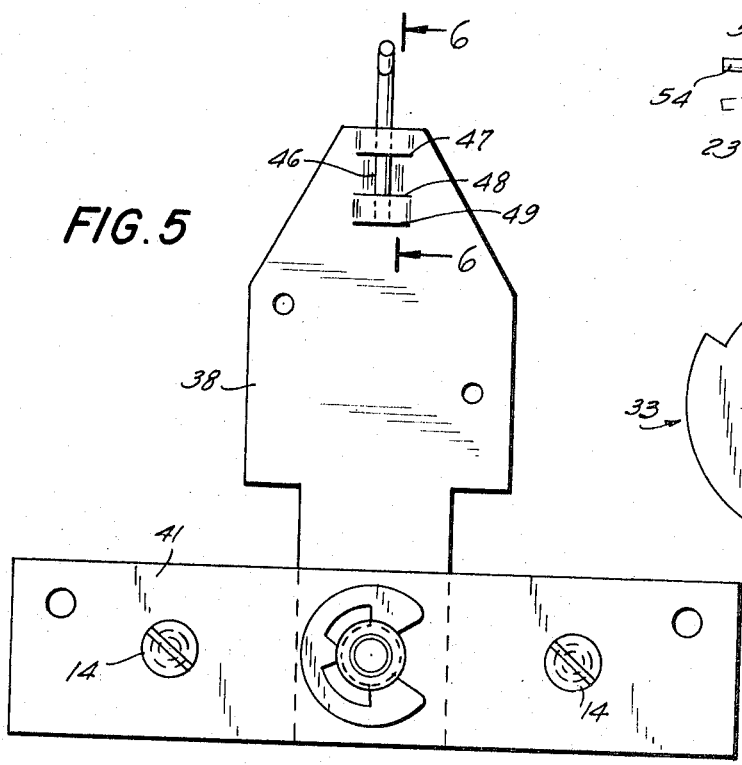
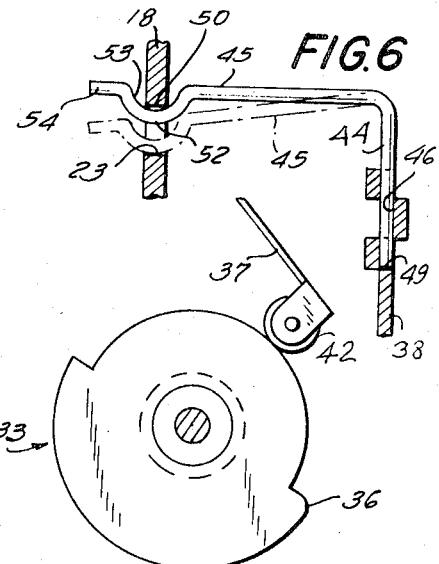

United States Patent Office 3,451,026
Patented June 17, 1969

3,451,026
REMOTE INDICATING THERMOMETER CIRCUIT CONTROL DEVICE
Louis J. Siri and Philip W. Embury, Jr., Fairport, N.Y., assignors to Qualitrol Corporation, Fairport, N.Y., a corporation of New York
Filed July 3, 1967, Ser. No. 650,933
Int. Cl. H01h 37/42
U.S. Cl. 337—322                    9 Claims

ABSTRACT OF THE DISCLOSURE

An electrical circuit control device which indicates temperature changes of a control medium, and is selectively settable for actuation of a control circuit when the control medium attains a particular degree of temperature. It includes a control shaft adapted to be rotatively turned in response to temperature changes of the medium. A cam carried by the shaft is cooperable with a switch arm to operate a switch in the circuit of a regulatory or signal instrument when the shaft has been turned a specific angular distance. A mounting plate carrying the switch is angularly adjustable to selectively re-set the point of cooperation of the cam with the switch arm. A detent finger fixed to the mounting plate is manually movable to effect the adjustment. It is arranged to engage in a selected notch to securely lock the mounting plate in its adjusted position and to visibly indicate the temperature reading at which the cam will cooperate with the switch arm. A plurality of such cams may be carried by the shaft, each cooperable independently of the others with a separate switch mounted upon a separate adjustable mounting plate, all in a compact arrangement and casing.

Background of the invention

This invention relates to the art of temperature responsive circuit control devices.

The present invention represents an improvement over the temperature control gauge of Patent 3,276,260. More particularly, the device of the present invention has a setting mechanism which is less complex, does not take up as much housing room, and is quick setting compared to the device of said patent. Further, the device of the present invention operates accurately and retains its setting even when subjected to severe vibration.

The general objective of the present invention is to provide an improved quickly settable circuit control device, the setting of which remains accurate even under severe vibration.

In accordance with the invention, there is provided a remote indicating thermometer circuit control device comprising a rotatively turnable control shaft, a dial plate having a graduated scale marked upon its face, the markings of which are radial to the axis of the shaft, a pointer fixed to the shaft for movement by the shaft in an arcuate path relative to the markings, a cam fixed to the shaft, a mounting plate, a control circuit switch fixed to the mounting plate having a switch trip arm extending into the path of angular movement of the cam, the mounting plate being supported coaxially with the shaft for relative pivoting about the axis of the latter to vary the angular position of the trip arm relative to the cam, a manually operable detent finger extending from the mounting plate for effecting selective angular adjustment of the mounting plate and as a consequence of the trip arm relative to the cam, and notch means registering with each scale marking for receiving the detent finger so as to lock it and the mounting plate in their adjusted position.

Brief description of the drawings

In the accompanying drawings:
FIG. 3 is an enlarged detail of the association of one of the cam and switch mounting elements relative to the control shaft;
FIG. 4 is a detail of the cam plate;
FIG. 5 is a detail of the switch mounting plate and detent finger;
FIG. 6 is a detail of the manner of engagement of the detent finger relative to the dial plate;
and
FIG. 7 shows a compact mounting arrangement of a plurality of switch mounting plates and related components to the control shaft.

Figure 2:
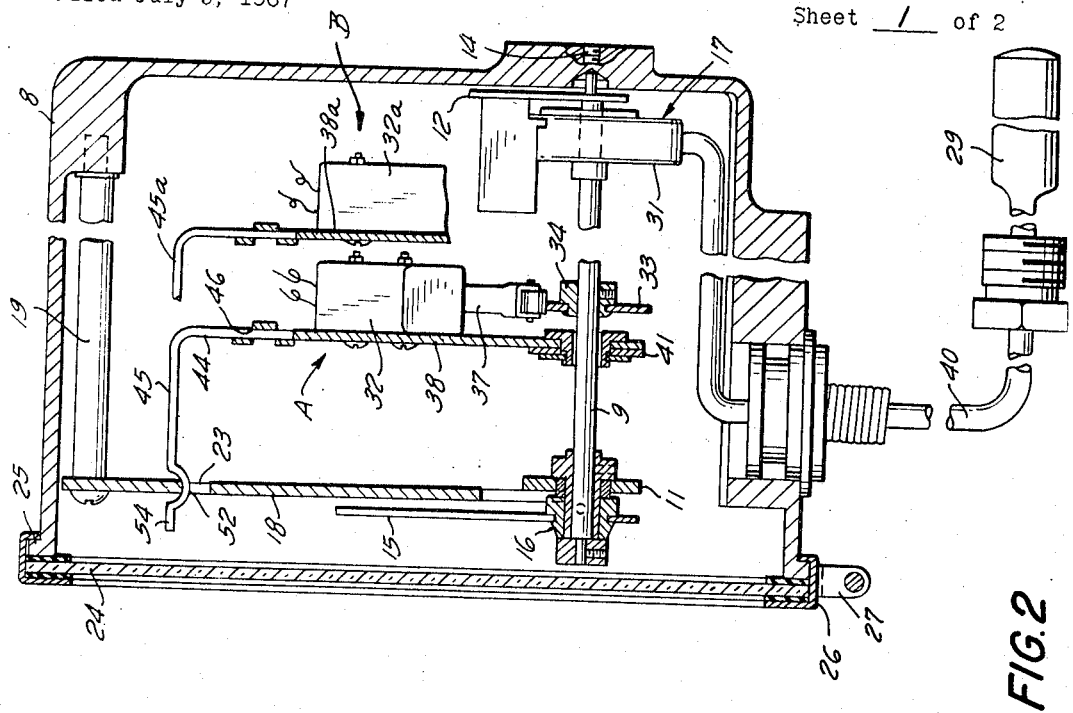
FIG. 2 is a sectional view of FIG. 1 with portions broken away for clarity of illustration.

Description of a preferred embodiment of the invention

Reference is directed to the drawing and now especially to FIGS. 1-6 wherein the circuit control device illustrating the invention includes a casing 8 having an open front end. A control shaft 9 is supported within the casing in stationary transverse plates 11 and 12 for relative rotation. The several plates are held stationary with the casing by any suitable means, such as bolting elements 14 which extend through the several plates and are anchored in the casing. A pointer 15 is fixed by means of its hub 16 to a front end of the shaft for rotary turning with the latter. A conventional temperature sensing means 17 is connected to the rear end of the shaft so as to cause in conventional manner turning of the shaft rotatively in accordance with temperature changes of an external remotely located control medium (not shown) with which the sensing means is associated.

As the shaft is rotatively turned, the pointer 15 is carried with it in an arcuate path relative to a graduated temperature indicating scale marked upon the front face of a dial plate 18. The latter is held stationary within the casing by means of suitable securing means, such as bolting or fastening elements 19 and 21. The several degree markings 20 of the scale extend from the lower edge of an arcuate slot 23 in the dial plate. The slot is concentric with the axis of rotation of the shaft and pointer; and the scale markings are radial to such axis.

The scale is visible through a window glass 24 closing over the front end of the casing. The glass overlies an annular flange 25 of the casing and is retained in position by means of a split bezel 26. The bezel encompasses both the glass and the flange. A pair of ears 27 depending from the ends of the bezel are drawn together by means of a clamping screw 28 to securely clamp the bezel about the glass and flange.

The temperature sensing means 17 may be any one of several known types adapted to turn a shaft upon its axis in response to temperature changes of an associated medium. For example, it may be of the coiled bimetal spring type; or, as illustrated here, it may be of the well known Bourdon tube type. Briefly, the latter includes an external remotely located thermometer bulb 29 designed to be exposed to the medium, such as fluid in a boiler, or other device the temperature of which is to be used to time the operation of a control circuit. The bulb 29 is connected by means of a suitably insulated capillary tube 40 to a coiled Bourdon tube 31 connected to the control shaft 9. Pressure developing within the Bourdon tube from fluid in the thermometer bulb in response to a temperature rise sensed by the latter actuates the Bourdon tube to turn the shaft.

The objective of the device illustrated in the accompanying drawings is to actuate a snap switch 32 in an electrical control circuit when the temperature of a related control medium has risen to a certain degree so as to cause operation of a signal, regulator, a shut-off valve or other suitable control instrument connected in the circuit. To this end, a disc cam plate 33 has a hub 34 which sleeves the control shaft 9 and is fixed thereto by means of a set screw 35 for rotation of the cam plate as a unit with the shaft. The cam plate has a peripheral cam riser 36 which is cooperable with a trip arm 37 of switch 32 to trip the switch as the shaft is caused to be rotated a predetermined degree as a result of a specific change in temperature of the control medium.

The switch is mounted fast to a face of an elongated mounting plate 38. The latter is pivotally supported upon a hub 39 for pivoting relative to the hub about an axis concentric with shaft 9. The hub 39 is retained in a stationary supporting plate 41 supported transversely of the casing by means of the bolting elements 14. Shaft 9 extends axially through hub 39 with some clearance and has rotation relative to the hub. The trip arm 37 of the switch carries at its end a cam engageable roller 42 which overlies the periphery of the cam plate 33, and is movable as a unit with the switch mounting plate in a plane coaxial with the shaft. By means of this construction, the switch mounting plate may be adjustably pivoted about its hub relative to the shaft to carry the trip arm and its roller to a selected angular position relative to the cam plate 33.

Advantageous manipulative detent means is provided to not only manually effect the angular adjustment of the switch mounting plate and the trip arm, but also to releasably latch the mounting plate in its adjusted position. The detent means further serves to indicate the temperature reading on the scale at which the switch is set to be tripped. The detent means includes a rigid or stiff resilient wire or right-angled or L-form, preferably of stainless spring steel having a depending leg 44 fixed in vertical extension of the body of the switch mounting plate; and further having a leg 45 offset at right angles to the mounting plate. Leg 45 serves as an indicator or finger to indicate the temperature setting at which the switch will be actuated by the cam 33. The depending leg 44 is here shown as fixed in a vertical opening 46, as best seen in FIGS. 2, 5 and 6. The opening 46 is provided by slitting the mounting plate transversely in three places as at 47, 48 and 49; depressing the material above slits 47 and 49 outwardly of one face of the mounting plate; and by depressing the intermediate material in the opposite direction. The detent leg 44 is inserted in the opening provided by the depressed material until it abuts an edge of the mounting plate created by the lowermost slit 49. The detent leg is then fixed in position to the mounting plate as by spot welding.

The detent finger 45 extends through the arcuate slot 23 of the dial plate 18 at right angles to the latter and to the switch mounting plate. The upper edge of the arcuate slot has a succession of U-form notches 51, each radially alinged or registering with a separate temperature degree marking 20 of the scale. The detent finger is upset to provide a depending bend as at 52 where the finger crosses the upper edge of slot 23. The finger is designed at this bend to engage in any selected one of the notches 51 with which the finger may then be registered. The plane of the bottom 50 of a notch is slightly lower than the normal plane of the bottom of the well formed by the bend 52 so that when the resilient finger is received in a notch it presses or is biased upwardly against the bottom of the notch. Each notch is deep enough to fully receive the bend 52. In this manner the finger is locked against escaping from the notch when the device is subjected to shock, severe vibration, or other abuse of the device. The sides of a notch are parallel and cooperate with the finger to prevent sideways escape of the finger; and opposed high areas at 53 of the bend are cooperable with opposite faces of the dial plate 18 to prevent undesirable axial movement of the finger relative to the notch.

To release or disengage the detent finger from a notch, it is necessary to depress the finger radially to bring it downward into the arcuate slot 23 clear of the notch, as indicated in broken line in FIG. 6. This is done by manually depressing a portion 54 of the finger which extends forwardly of the dial plate 18. It is apparent that the angular setting of the switch arm 37 relative to the underlying cam plate 33 may be adjusted clockwise or counterclockwise to a new position. This is done by disengaging the detent finger 45 from the notch in which it is then engaged, then manually moving the detent finger in a clockwise or counterclockwise direction in the arcuate slot 23 to the extent required to register it with a notch opposite a selected temperature degree marking. The switch mounting plate and switch will be carried as a unit with the finger to reposition the switch arm 37 to a new setting relative to the periphery of the cam plate. Then when the detent finger is manually released, it will move upwardly under its inherent biasing force to engage in the then registering notch to lock the switch mounting plate securely in its new setting.

The notch in which the detent finger is engaged corresponds to the temperature marking with which it is registered. When the shaft has been turned as a consequence of a rise in temperature of the medium sensed to carry the pointer 15 over the face of the dial plate to the marking with which the detent finger is registered, the cam riser 36 of the cam plate will have been carried with the shaft sufficiently to actuate the switch arm to operate the switch. Operation of the switch will then affect a circuit to a suitable control instrument (not shown). The cam riser 36 extends circumferentially for a predetermined number of degrees. This is desirable so as to keep the switch actuated as the shaft continues to turn as a result of a continuing change in the temperature of the control medium.

The glass window 24 at the front of the casing protectively guards the mechanism of the device from the entrance of foreign matter. The scale of the dial plate and the setting of the detent finger are visible through the window. When it becomes necessary to re-set the detent finger to a new notch position, the bezel clamp screw 28 is loosened to permit removal of the bezel and glass 24. This allows easy manual access at the front of the casing to the detent finger, since the extended portion 54 of the finger will be substantially at the front end of the casing. It may be desirable to eliminate the glass window for easier access to the finger in installations wherein the glass window is not required for protection of the dial plate.

The cam plate 33, the pivotable switch mounting plate 38 with its switch 32, and the detent finger 45 define a circuit control unit. It is understood that the device may include one, or a plurality of such units similarly associated with the control shaft 9 in axial spaced relation to one another, each associated with an individual control circuit. In such an arrangement, the detent finger of each unit would be set in a separate selected notch 51 of the dial plate to indicate the temperature at which the related control circuit would be actuated. Where there are several such units, each detent finger will be limited by means of the settings of neighboring fingers as to the range of notches in which it may be selectively engaged, as indicated by the detent fingers 45 and 45a in FIG. 1.

Figure 1:
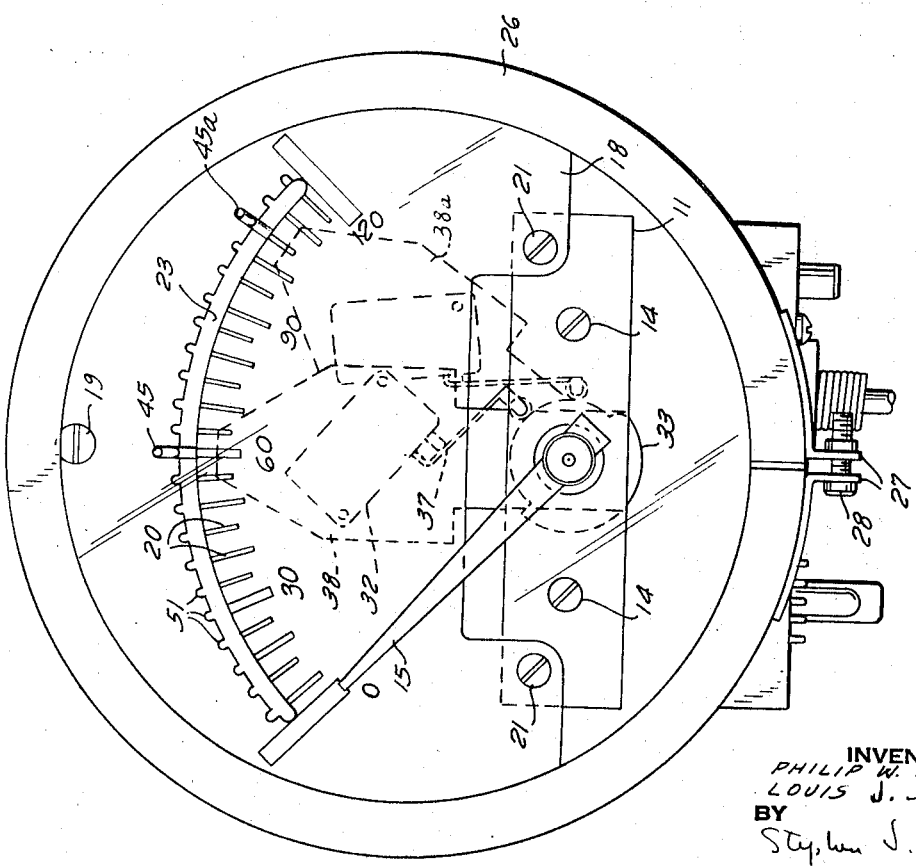
FIG. 1 is a front end view of a remote indicating thermometer circuit control device embodying the invention.

FIGS. 1 and 2 show a second switch mounting plate 38a carrying a snap switch 32a and the detent finger 45a of a second circuit control unit B. Since its arrangement and mounting is similar to that of a first unit A, the second unit B has not been shown in full.

FIG. 7 discloses a compact arrangement of several circuit control units C, D and E relative to a common control shaft 9a. FIG. 7 is intended to illustrate how a plurality of the units may be arranged in close proximity to one another along the shaft and thereby allow use of a smaller casing 8a than would otherwise be permissible. It is to be noted that units C and D are arranged with their switch mounting plates 38c and 38d in closely spaced back-to-back relation, both being separated by a common transverse stationary supporting plate 41a which is rigid with the casing. A single hub 39a retained in the supporting plate serves as a common pivot axis for both switch mounting plates 38c and 38d. Each plate is pivotable about the common hub 39a relative to its related cam 33c or 33d independently of the other by means of its respective detent finger 45c or 45d. The switch mounting plate of the odd unit E pivots about an individual hub 39e retained in a separate stationary transverse supporting plate 41e.

What is claimed is:

1. A remote indicating thermometer circuit control device comprising a rotatively turnable control shaft, means responsive to temperature changes for turning the shaft, a dial plate having a graduated scale marked upon its face the markings of which are radial to the axis of the shaft, a pointer fixed to the shaft for movement by the shaft in an arcuate path relative to the markings, a cam fixed to the shaft, a mounting plate, a control circuit switch fixed to the mounting plate having a switch trip arm extending into the path of angular movement of the cam, the mounting plate being supported coaxially with the shaft for relative pivoting about the axis of the latter to vary the angular position of the trip arm relative to the cam, a manually operable detent finger extending from the mounting plate for effecting selective angular adjustment of the mounting plate and as a consequence of the trip arm relative to the cam, and notch means registering with each scale marking for receiving the detent finger so as to lock it and the mounting plate in their adjusted position.

2. A remote indicating thermometer circuit control device as in claim 1, wherein the dial plate has an arcuate slot concentric with the axis of the shaft, each scale marking extends from an edge of the slot, and the detent finger has a manually engageable portion projecting through the slot forwardly of the face of the dial plate.

3. A remote indicating thermometer circuit control device as in claim 2, including a casing in which the shaft is rotatably supported having an open front end through which manual access may be had to the projecting portion of the detent finger, the projecting portion of the detent finger being located in close proximity to the open front end of the casing.

4. A remote indicating thermometer circuit control device as in claim 3, wherein a window glass closes over the open front end of the casing through which the scale and projecting portion of the detent finger are visible, and detachable bezel means is provided releasably clamping the window to the casing.

5. A remote indicating thermometer circuit control device as in claim 1, wherein the scale markings radiate from the lower edge of the arcuate slot and a separate notch of U-form is provided in the upper edge of the slot registering with each scale marking.

6. A remote indicating thermometer circuit control device as in claim 5, wherein the detent finger is upset where it crosses through the arcuate slot whereby it provides a bend for reception into a selected notch.

7. A remote indicating thermometer circuit control device as in claim 5, wherein the detent finger is formed of resilient stiff material and is biased upwardly against the bottom of the notch in which it is received.

8. A remote indicating thermometer circuit control device as in claim 6, wherein the bend of the upset finger is fully receivable in the selected notch and has cooperation with the side walls of the notch so ash to restrain the detent finger against escape in an angular direction, and opposed areas of the bend have cooperation with opposite faces of the dial plate so as to restrain the detent finger against vibratory movement in an axial direction.

9. A remote indicating thermometer circuit control device as in claim 1, including a casing, and a stationary support in the casing having a hub projecting in part from opposed faces of the support, wherein a pair of separate mounting plates are provided one to each side of the support and pivoted upon the corresponding projecting part of the hub for relative pivoting independently of the other mounting plate.

References Cited

UNITED STATES PATENTS

| | | | |
|---|---|---|---|
| 3,276,260 | 10/1966 | Weiler | 337—310 |
| 1,297,326 | 3/1919 | Dahl et al. | 200—56 |
| 1,113,024 | 11/1914 | Lawrence. | |

FOREIGN PATENTS

| | | |
|---|---|---|
| 205,235 | 1/1957 | Australia. |
| 44,423 | 9/1960 | Poland. |
| 111,027 | 6/1964 | Czechoslovakia. |

BERNARD A. GILHEANY, *Primary Examiner.*

R. L. COHRS, *Assistant Examiner.*

U.S. Cl. X.R.

200—56, 166